(12) United States Patent
Merai et al.

(10) Patent No.: US 11,074,470 B2
(45) Date of Patent: Jul. 27, 2021

(54) SYSTEM AND METHOD FOR AUTOMATICALLY IMPROVING GATHERING OF DATA USING A DATA GATHERING DEVICE

(71) Applicants: Mehdi Merai, Westmount (CA); Ali Elawad, Montreal (CA)

(72) Inventors: Mehdi Merai, Westmount (CA); Ali Elawad, Montreal (CA)

(73) Assignee: LA SOCIÉTÉ DATAPERFORMERS INC., Montreal (CA)

( * ) Notice: Subject to any disclaimer, the term of this patent is extended or adjusted under 35 U.S.C. 154(b) by 53 days.

(21) Appl. No.: 16/212,309

(22) Filed: Dec. 6, 2018

(65) Prior Publication Data

US 2019/0171897 A1 Jun. 6, 2019

Related U.S. Application Data

(60) Provisional application No. 62/595,196, filed on Dec. 6, 2017.

(51) Int. Cl.
*G06K 9/20* (2006.01)
*G06K 9/00* (2006.01)
(Continued)

(52) U.S. Cl.
CPC ......... *G06K 9/209* (2013.01); *G06K 9/00624* (2013.01); *G06K 9/036* (2013.01);
(Continued)

(58) Field of Classification Search
CPC .. G06K 9/209; G06K 9/00624; G06K 9/6262; G06K 9/6267; G06K 9/036; G06K 9/00771; H04N 5/23296; H04N 5/23299; H04N 5/23222; H04N 5/2352; H04N 5/23216; G06N 5/048; G06N 20/00; G06N 3/008; G06N 3/08
See application file for complete search history.

(56) References Cited

U.S. PATENT DOCUMENTS 9,465,444 B1 * 10/2016 Ramaswamy .......... G06F 3/017
2018/0176461 A1 * 6/2018 Venetianer ............. H04N 5/238
(Continued)

*Primary Examiner* — Tat C Chio
(74) *Attorney, Agent, or Firm* — Ziolkowski Patent Solutions Group, SC

(57) ABSTRACT

A computer-implemented system and method for automatically improving gathering of data includes processing first input data acquired by a data gathering device to generate a first prediction and a corresponding confidence score. If the confidence score is below a threshold, then generating and applying a set of at least one action to the data gathering device, such as changing acquisition settings of the device. Second input data acquired using the data gathering device having the action applied thereto is further received and processed to generate a second prediction and corresponding confidence score. The set of action to-be-applied to the device is further modified based on the difference.

The generation of the at least one action, such as changing the acquisition settings, can be based on an acquisition settings adjustment model and the modification of the action can include updating the model by machine learning (ex: reinforcement learning). The updated model can be applied to subsequent iterations of data gathering.

25 Claims, 9 Drawing Sheets

(51) Int. Cl.
*H04N 5/232* (2006.01)
*G06N 5/04* (2006.01)
*G06K 9/62* (2006.01)
*G06N 20/00* (2019.01)
*G06K 9/03* (2006.01)
*H04N 5/235* (2006.01)

(52) U.S. Cl.
CPC ......... *G06K 9/6262* (2013.01); *G06K 9/6267* (2013.01); *G06N 5/048* (2013.01); *G06N 20/00* (2019.01); *H04N 5/2352* (2013.01); *H04N 5/23216* (2013.01); *H04N 5/23222* (2013.01); *H04N 5/23296* (2013.01); *H04N 5/23299* (2018.08)

(56) References Cited

U.S. PATENT DOCUMENTS

2018/0276781 A1* 9/2018 Oliveria ............... H04N 5/2351
2019/0122378 A1* 4/2019 Aswin .................. G06N 3/0418

* cited by examiner

SYSTEM AND METHOD FOR AUTOMATICALLY IMPROVING GATHERING OF DATA USING A DATA GATHERING DEVICE

RELATED PATENT APPLICATION

The present application claims priority from U.S. provisional patent application No. 62/595,196, filed Dec. 6, 2017 and entitled "SYSTEM AND METHOD FOR AUTOMATED IMPROVEMENT OF INPUT FOR MACHINE LEARNING", the disclosure of which is hereby incorporated by reference in its entirety.

TECHNICAL FIELD

The technical field is generally related to computing. More particularly, it relates to computer-implemented systems and methods for data collection and reinforcement learning.

BACKGROUND

In the context of computer vision, an adequately trained machine learning algorithm should be able to recognize a specific object that it was trained for (such as an apple, for example). A machine learning algorithm can be broken down into two phases: the training phase, and the execution phase. During the execution phase, the machine learning algorithm can be operating as an object classification engine.

During the training phase, the machine learning algorithm (such as an artificial neural network) is provided with a data set which allows the algorithm to pair input data with an expected output. In the context of computer vision, this can comprise providing a data set which pairs input images with an object (or objects) to be recognized. During the execution phase, the algorithm will receive an input and compare it with parameters learned from the training data set in order to make a prediction. In the context of computer vision, the algorithm will receive an input image and will output the probability that the image contains the object (or objects) that it was trained for.

Machine learning algorithms depend heavily on input quality; if the input does not provide enough features, the machine learning algorithm will likely fail its prediction. For example, in the context of computer vision, input images are typically acquired via an image capture device (such as a camera). If the image capture devices acquires an image of an object which is too far, or which is not positioned at an optimal angle, and/or if parts of the object are outside of the devices field of view, the input provided to the algorithm may be of insufficient quality, and the algorithm may have difficulty recognizing the object.

In order to overcome this problem, human intervention is often necessary to adjust the data collection device to ensure that sufficient input quality is provided. For example, this can require manual adjustment of capture device's angle, optical zoom, etc. There is therefore a need for an improved system and method which overcomes at least some of the shortcomings in the prior art.

SUMMARY

According to one aspect there is provided a computer-implemented method for automatically improving gathering of data. The method includes receiving first input data acquired using a data gathering device and processing the first input data to generate a first prediction and a corresponding confidence score of the first prediction. If the confidence score of the first prediction is below a predetermined threshold, the method further includes generating a set of at least one action to apply to the data gathering device based on the first input data, applying the set of at least one action to the data gathering device, receiving second input data acquired using the data gathering device, processing the second input data to generate a second prediction and a corresponding confidence score of the second prediction, calculating a difference between the confidence of the first and second predictions, and modifying the set of at least one action to apply to the data gathering device based on the difference.

According to another aspect, there is provided a computer-implemented system for automatically improving gathering of data. The system includes at least one data storage device and at least one processor operably coupled to the at least one storage device. The at least one processor is configured for receiving first input data acquired using a data gathering device and processing the first input data to generate a first prediction and a corresponding confidence score of the first prediction. If the confidence score of the first prediction is below a predetermined threshold, the method further includes generating a set of at least one action to apply to the data gathering device based on the first input data, applying the set of at least one action to the data gathering device, receiving second input data acquired using the data gathering device, processing the second input data to generate a second prediction and a corresponding confidence score of the second prediction, calculating a difference between the confidence of the first and second predictions, and modifying the set of at least one action to apply to the data gathering device based on the difference.

According to yet another there is provided a non-transitory computer-readable medium having instructions stored thereon for execution by a processor, the instructions when executed by the processor performing the method as described herein.

According to embodiments of systems and methods described herein, the first input data is acquired in accordance with a first set of acquisition settings of the data gathering device, generating the set of at least one action to apply to the data gathering device based on the first input data comprises generating a second set of acquisition settings of the data gathering device based on a computer-implemented acquisition settings adjustment model, applying the set of at least one action to the data gathering device comprises configuring the data gathering device in accordance with second set of acquisition settings, acquiring the second input data using the data gathering device comprises acquiring the second input data while the data gathering device is configured to the second set of acquisition settings, and modifying the sets of at least one action to apply to the data gathering device based on the difference comprises updating the acquisition settings adjustment model based on the difference.

According to embodiments of systems and methods described herein, the acquisition settings adjustment model is further updated based on the first set of acquisition settings and the second set of acquisition settings.

According to embodiments of systems and methods described herein, the computer-implemented acquisition settings adjustment model is pre-trained using machine learning and updating the acquisition settings adjustment model based on the difference is carried out using reinforcement learning.

According to embodiments of systems and methods described herein, such systems and methods further include acquiring a third input data using the data gathering device, processing the third input data to generate a third prediction and a corresponding confidence of the third prediction and if the third prediction is below the predetermined threshold:
generating an additional set of at least one action to apply to the data gathering device based on the third input data by generating a third set of acquisition settings of the data gathering device based on the acquisition settings adjustment model as updated;
applying the additional set of at least one action to the data gathering device;
acquiring fourth input data using the gathering device having the additional set at least one action applied thereto.

According to embodiments of systems and methods described herein, the data gathering device is an image capture device and the first input data is a first digital image captured by the image capture device.

According to embodiments of systems and methods described herein, processing the first input data to generate a first prediction comprises applying object classification on the captured digital image, the first prediction is a classification of an object within the scene of the first captured digital image and the confidence of the first prediction is a classification score for the classified object of the first captured digital image.

According to embodiments of systems and methods described herein, the second input data is a second digital image captured by the image capture device, the second prediction is a classification of the object within the scene of the second captured digital image, and the confidence of the second prediction is a classification score for the classified object of the second captured digital image.

According to embodiments of systems and methods described herein, the first set of acquisition settings of the data gathering device is a first set of image capture settings of the image capture device, generating the set of at least one action to apply to the data gathering device based on the first input data comprises generating a second set of image capture settings of the image capture device based on an image capture settings adjustment model, applying the set of actions to the data gathering device comprises configuring the image capture device in accordance with the second set of image capture settings, acquiring second input data using the data gathering device comprises acquiring the second digital image while the image capture device is configured to the second set of image capture settings and modifying the set of at least one action to apply to the data gathering device based on the difference comprises updating the image capture settings adjustment model based on the difference between the classification score for the first captured digital image and the classification score for the second captured digital image.

According to embodiments of systems and methods described herein, the image capture settings adjustment model is further updated based on the first set of image capture settings and the second set of image capture settings.

According to embodiments of systems and methods described herein, the first or second image capture settings comprises one or more of zoom, pan, tilt, white balance, exposure, ISO settings, aperture, shutter speed, depth sensor, frame rate, position of a vehicle having the image capture device mounted thereto and lighting subsystem.

According to embodiments of systems and methods described herein, the image capture settings adjustment model is pre-trained using machine learning and updating the image capture settings adjustment model based on the difference is carried out using machine learning.

According to embodiments of systems and methods described herein, such systems and methods further include receiving a third digital image acquired using the image capture device, processing the third digital image to apply a classification of an object within the scene of the third digital image and to generate a classification score for the classified object of the third captured digital image, and if the classification score for the classified object of the third captured digital image is below the predetermined threshold:
generating an additional set of image capture settings to apply to the image capture device based on the third digital image and the image capture settings adjustment model as updated;
applying the additional set of image capture settings to the image capture device;
receiving a fourth digital image acquired using the image capture device having the additional set of image capture settings applied thereto.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
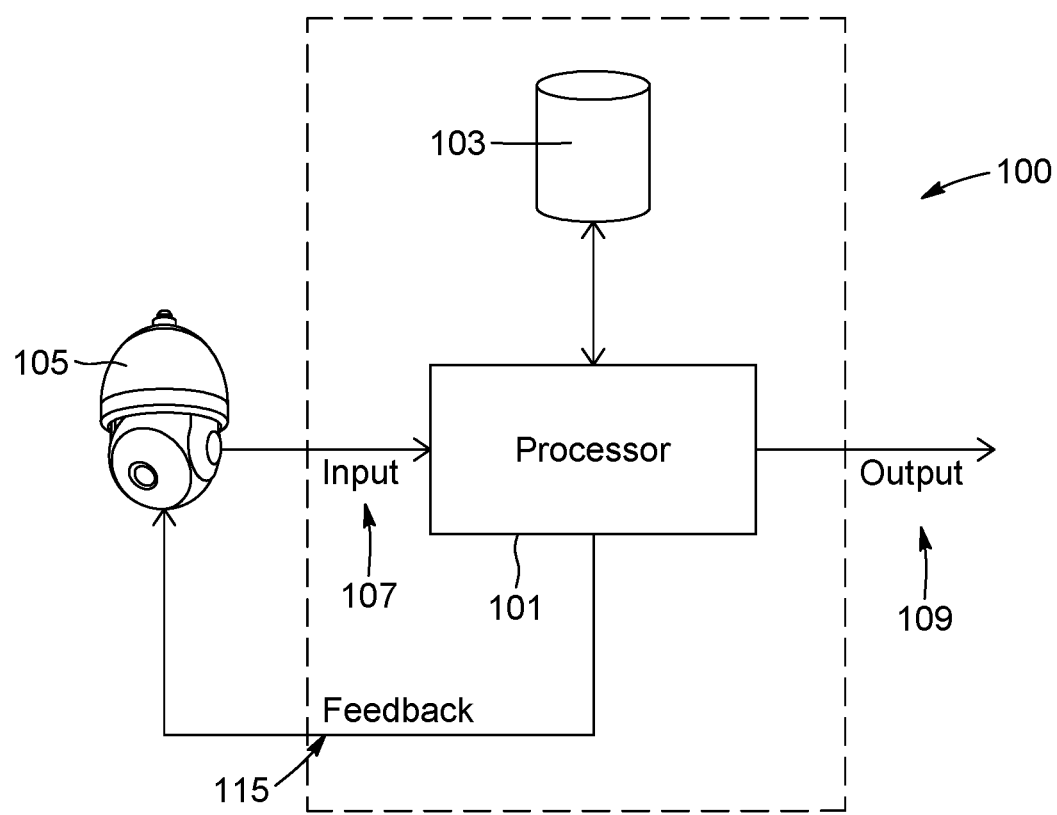
FIG. 1 illustrates a schematic diagram of a generalized machine learning system according to one example embodiment.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

Preferred embodiments of systems and methods for automatic improvement of input for machine learning are provided herein. These embodiments are but some of many possible implementations. As such, the examples provided should not be taken as to limit the scope of the invention in any way. In the figures, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom.

One or more systems described herein may be implemented in computer programs executing on programmable computers, each comprising at least one processor, and a data storage system (including volatile and non-volatile memory and/or storage elements). For example, and without limitation, the programmable computer may be a programmable logic unit, a mainframe computer, server, and personal computer, cloud based program or system, laptop, personal data assistance, cellular telephone, smartphone, game console, AR/VR device, or tablet device.

The at least one processor may be configured to provide information processing capabilities. As such, processor may include one or more of a digital processor, an analog processor, a digital circuit designed to process information, an analog circuit designed to process information, a state machine, and/or other mechanisms for electronically processing information. Although processor is shown herein as a single entity, this is for illustrative purposes only. In some implementations, processor may include a plurality of processing units. These processing units may be physically located within the same device, or processor may represent processing functionality of a plurality of devices operating in coordination. Processor may be configured to execute various modules described herein, and/or other modules. Processor may be configured to execute modules and/or other modules by software; hardware; firmware; some combination of software, hardware, and/or firmware; and/or other mechanisms for configuring processing capabilities on processor. As used herein, the term "module" may refer to any component or set of components that perform the functionality attributed to the module. This may include one or more physical processors during execution of processor readable instructions, the processor readable instructions, circuitry, hardware, storage media, or any other components.

The data storage system may comprise non-transitory storage media that electronically stores information. The electronic storage media of electronic storage may include one or both of system storage that is provided integrally (i.e., substantially non-removable) with the system and/or removable storage that is removably connectable to the system via, for example, a port (e.g., a USB port, a firewire port, etc.) or a drive (e.g., a disk drive, etc.). The data storage system may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The data storage system may include one or more virtual storage resources (e.g., cloud storage, a virtual private network, and/or other virtual storage resources). The data storage system may store software algorithms, information determined by processor, information received within the system, information received from external systems or device, and/or other information that enables functionality as described herein.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

Furthermore, the system, processes and methods of the described embodiments are capable of being distributed in a computer program product comprising a computer readable medium that bears computer-usable instructions for one or more processors. The medium may be provided in various forms including one or more diskettes, compact disks, tapes, chips, wireline transmissions, satellite transmissions, internet transmission or downloadings, magnetic and electronic storage media, digital and analog signals, and the like. The computer-usable instructions may also be in various forms including compiled and non-compiled code.

With reference to FIG. 1, a machine learning system 100 is shown according to an embodiment. Machine learning system 100 comprises a processor 101 and memory 103 (ex: data storage subsystem). The machine learning system 100 is in communication with an input device 105. The input device 105 is a data gathering device that is operable to gather data that can be processed by the machine learning system 100 to extract additional information. Input device 105 provides an input 107 to processor 101, and processor 101 executes instructions stored in memory 103 in order to implement a machine learning process to generate an output 109 based on the provided input 107. The machine learning process herein refers to a computer-implemented process that can progressively improve its performance of a specific task. The machine learning process can be pre-trained using a training data set. As can be appreciated, input device 105 can be any type of data acquisition device depending on the machine learning-based task being performed. In the context of FIG. 1, the machine learning process performs and improves upon a task of processing input data.

The input device 105 operates to gather electronic data that is representative of a real-world object and/or condition. It will be understood that the electronic data gathered by the input device 105 of the real-world object and/or condition will vary depending on the acquisition settings to which the input device 105 is configured. It will be further understood that gathering data at adjusted acquisition settings of the input device 105 will change the representative data, which can improve or deteriorate the extraction of information from (i.e. processing of) the gathered data.

In the various example embodiments described herein, the machine learning system 100 is configured for object recognition, and input device 105 comprises an image capture device (ex: camera) which provides a digital image 105 as input to the machine learning system 100 and the processor 101. Image capture device herein refers to any type of device that is operable to capture one or more digital images that is representative of a scene. The image capture device can be a camera that can capture still digital images or a video. It will be understood that the capture digital image can be a frame of the video or a combination or composite of multiple captured frames. The digital image can capture a scene in the human-visible frequency range. Alternatively, or additionally, the digital image can capture a scene in frequencies outside of the visible range, such as infra-red, ultraviolet, or using other techniques such as LIDAR and/or Radar.

It will be understood that other types image acquisition devices and/or non-imaging sensors are also possible.

In the embodiment in the context of object recognition, the output 109 generated by processor 101 corresponds to a probability that the input images 105 contain an object (or objects) which the machine learning process is trained to identify. The machine learning process can be trained to execute object classification and the output 109 can further indicate a type or class of each detected object and the probability that the object belongs to that class.

Figure 2:
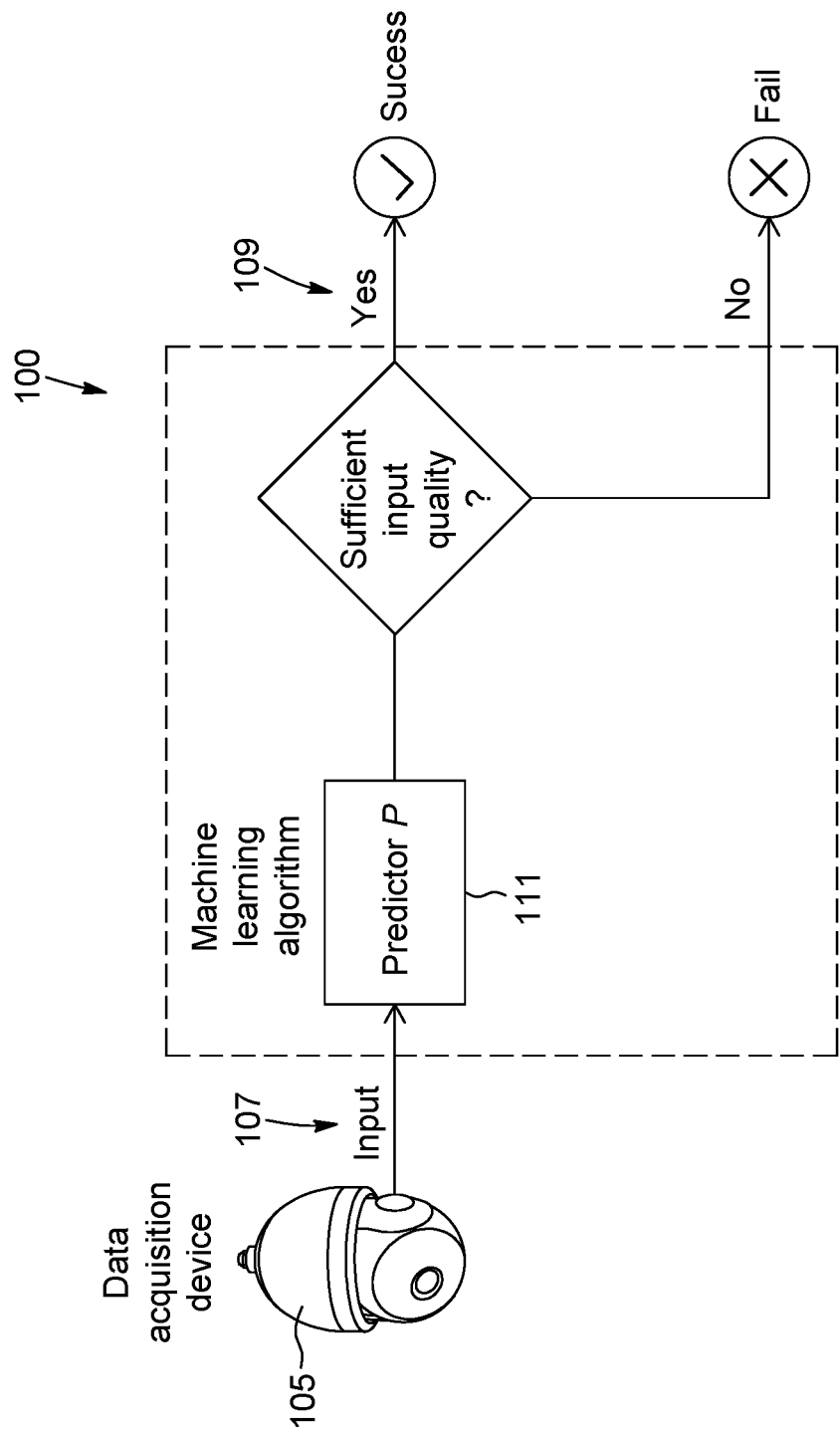
FIG. 2 illustrates a schematic diagram of a basic system for implementing a machine learning process according to one example embodiment.

As can be appreciated, processor 101 can comprise a plurality of processing modules in order to implement the machine learning process. With reference to FIG. 2, a basic system for implementing the machine learning process implemented in processor 101 is shown according to an embodiment. In this embodiment, processor 101 comprises a predictor module 111. The predictor module 111 serves to receive the input 107 from input device 105, and compare the input 107 with parameters learned from the training data set in order to generate an output 109 comprising a prediction value with an associated confidence. In the present embodiment, predictor module 111 is configured as a neural network P, although it is appreciated that other types of artificial intelligence algorithms or other kinds of predictors are also possible. For example, neural network P can be any classifier or regressor aiming to map a set of features from an input to a label (i.e. class or type).

In the context of machine vision, the predictor module 111 will receive an input digital image 107 from an image capture device 105, and output a prediction 109 corresponding to whether or not an object is recognized in the image. This prediction includes a confidence of whether or not a particular object is recognized in the image, for example in a range of 0% to 100%. The predictor module 111 can be configured (via machine learning training) to classify a detected object and the prediction can further indicate a class or type of the detected object and a confidence score that the detected object belongs to the defined class or type. It can be determined that an object is recognized in the image if, for example, the confidence is above a predetermined confidence threshold. It can also be determined that a recognized object belongs to the identified class or type if the confidence score for that class or type is above a predetermined confidence threshold.

As can be appreciated, the ability of predictor module 111 to determine the existence of an object (and/or that the detected object belongs to a particular class) is dependent on the quality of the input image 107 provided by image capture device 105. If the input 107 is of sufficient quality, the predictor module 111 should be able to successfully predict the presence or absence of an object in the image and provide a relevant output 109. Where object classification is carried out, the predictor module should be able to successfully classify the detected object within a particular class or type. A prediction of presence of an object and/or classification of the detected object can be determined as being successful if the confidence score generated by the predictor module 111 exceeds the predetermined confidence threshold.

However, if the input 107 is not of sufficient quality, the predictor 111 can fail in its prediction, for example resulting in a false negative, or by providing an inconclusive output. The presence of an object and/or non-classification of an object can be determined if the confidence score generated by the predictor module 111 is below the predetermined confidence threshold.

The quality of the input 107 can be affected by many different factors. In the context of machine vision applied to an input image captured by a data gather device 105 in the form of an image capture device, 105, such factors can include, for example, the manner in which the object and its features are presented in the captured image. Accordingly, the input quality can be insufficient if the object of interest is out of focus, out of frame, too far away, positioned at an unexpected angle, insufficiently illuminated, or portrayed in any other way in which distinctive features of the object are obscured from view or distorted in any way. Other factors affecting the quality of the input can include, for example, properties of the input image. Accordingly, the input quality can be insufficient if image properties such as resolution, contrast, saturation, sharpness, brightness, exposure, etc. are not properly tuned, and/or if there is too much noise or distortion in the image.

Figure 3:
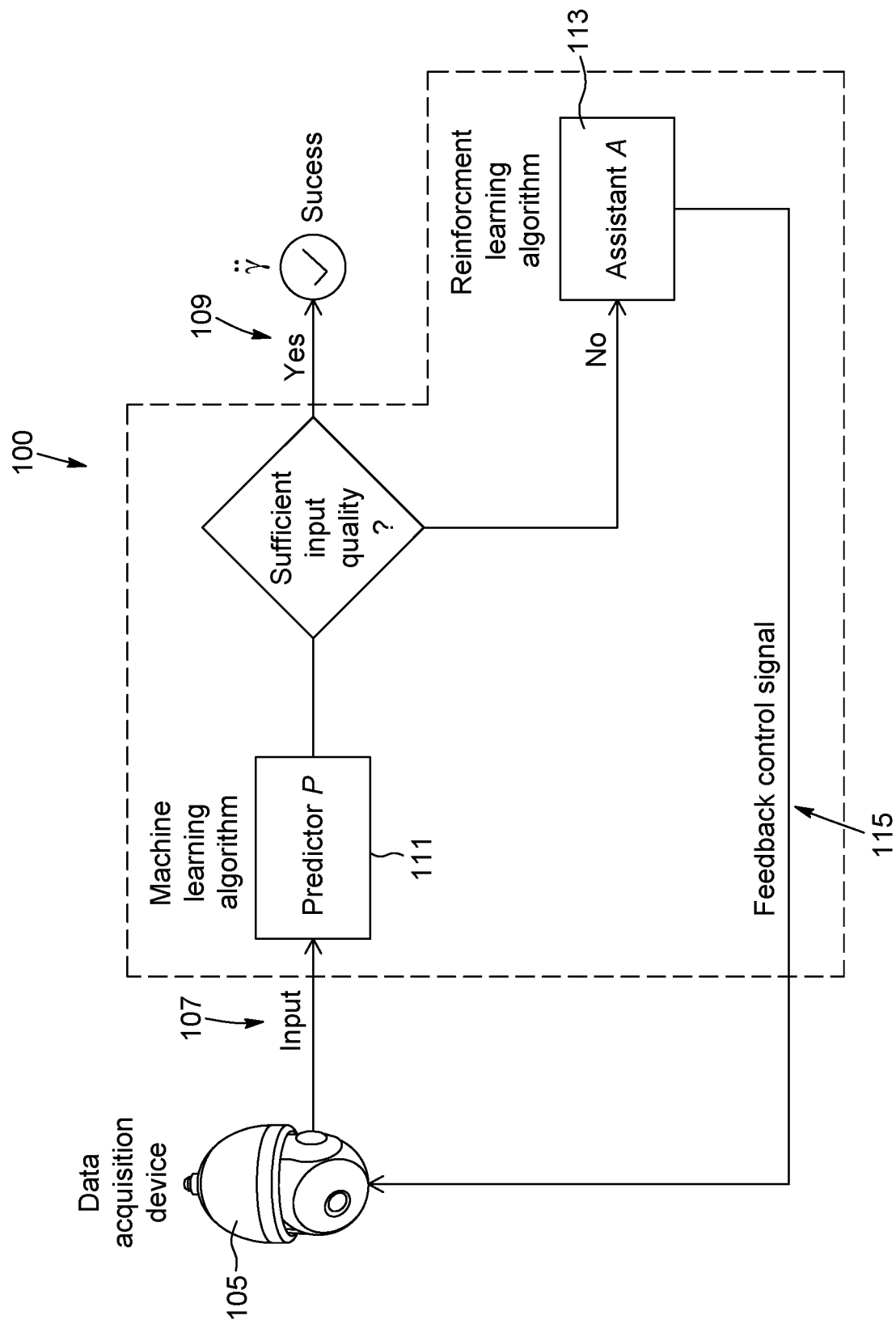
FIG. 3 illustrates a schematic diagram of an improved machine learning process with automatic improvement to data gathering according to one example embodiment.

With reference now to FIG. 3, an improved proactive machine learning process implemented in processor 101 is shown according to an embodiment, said process configuring system 100 to automatically improve input for machine learning. That is, the process is operable to automatically improve the gathering of data using the data gathering device 105. Broadly described, the improved machine learning process includes a feedback loop to automatically improve input quality if necessary. In this embodiment, processor 101 comprises a predictor module 111 and an assistant module 113. The predictor module 111 receives an input 107 from input device 105, and compares the input 107 with parameters learned from the training data set in order to generate a prediction. If it is determined that the input 107 is of sufficient quality, for example if the prediction probability is above a predetermined threshold, the predictor 111 can generate an output 109 with success. However, if it is determined that the input 107 is not of sufficient quality, for example if the prediction probability is below a predetermined threshold, assistant module 113 can be operated to automatically tune input device 105. The processing of the input 107 to generate a prediction corresponds to a first machine learning subprocess of the improved proactive machine learning process of the example embodiment illustrated in FIG. 3.

In the present embodiment, assistant module 113 is configured to generate a feedback signal 115 for controlling input device 105, based on the input 107 and/or the output of predictor module 111. Input device 105 is subsequently tuned and/or adjusted, preferably so that it can acquire new data and provide an improved input 107 to processor 101 for subsequent prediction. As can be appreciated, this process can be repeated until input 107 is of sufficient quality such that predictor 111 can generate an output 109 with success.

In the context of machine vision, the predictor module 111 will receive an input image 107 from an image acquisition device 105, and generate a prediction corresponding to whether or not an object is recognized in the image. If the input 107 is of sufficient quality, the predictor 111 should be able to successfully predict the presence or absence of an object in the image and provide a relevant output 109 which recognizes and/or classifies objects in the image. However, if the input 107 is not of sufficient quality, the predictor 111 can fail in its prediction and thus be unable to classify objects within the image. If the predictor 111 fails, the assistant module 113 can generate a set of at least one action (ex: a sequence of actions) or instructions to control camera 105 in an effort to improve the input quality of captured image 107, and allow subsequent predictions to be successful.

Image acquisition device 105 (ex: camera) can be controlled in a number of different ways in order to improve quality of input 107. For example, camera 105 is preferably controllable to adjust its field of view, such as via pan, tilt and/or zoom operations. Such operations can be carried out physically, for example by pivoting or translating the camera, and/or by physically adjusting its lens, for example using actuators and/or motors. Such operations can also be carried out digitally, for example by digitally cropping a region of interest within a larger raw image acquired by input device 105. In some embodiments, the point of view of camera 105 can be adjusted, for example by physically relocating camera 105. In some embodiments, camera 105 can be controlled to adjust image capture settings, such as exposure, brightness, sensitivity, etc. In yet further embodiments, camera 105 can be operated to pre-process an acquired image before providing it as an input to predictor module 111, for example to digitally enhance properties of the image. It is appreciated, however, that pre-processing can be done on camera 105, or on the processor 101 directly. Preferably, camera 105 is electronically controllable, for example in response to receiving a control signal commanding/instructing a predetermined action.

Preferably, assistant module 113 is configured to determine the appropriate operations to apply to input device 105 in order to improve the quality of input 107. For example, assistant module 113 can analyze/process a previous input 107 in order to determine what corrective measures are most appropriate, and to generate the appropriate feedback signal to tune input device 105. The assistant module 113 can further determine the most appropriate time to apply any corrective measures. In the context of machine vision, the assistant module 113 can process input 107 in order to determine an action or a set of actions to apply to camera 105 which are most likely to produce a better input quality. For example, upon analyzing input 107, assistant module 113 can determine that an object is likely out of frame, and can subsequently generate a set of pan/tilt/zoom commands to control camera 105 such that object will be fully in frame when a subsequent image is captured. As can be appreciated, using this approach, more information can be collected about a scene, allowing object recognition to be improved, and allowing for objects to be recognized with higher certainty. As another example, upon analyzing input 107, assistant module 113 can determine an area of interest within the input image 107 for further processing. For example, assistant module 113 can distinguish between zones in the image 107 in which there is nothing to discover, and zones in the image 107 which are likely to contain something to discover and which may require further processing to complete the recognition. Upon identifying the areas of interest, assistant module 113 can control camera 105 and/or preprocess image 107 in order to crop the image 107 to extract the areas of interest. In this fashion, processing for object recognition can be narrowed down and/or focused only on the identified areas of interest.

Within each iteration of controlling input device 105 to gather addition data in the form of input 107, the parameters of the assistant module 113 for generating an appropriate feedback signal 115 can be adjusted over time based on which parameters in the feedback signal 115 led to an improvement in the subsequent prediction of subsequently received input 107 from the input device 105. The processing of the input 107 and/or the output of the predictor module 111 corresponds to a second machine learning subprocess of the improved proactive machine learning process of the example embodiment illustrated in FIG. 3.

In the example embodiment illustrated in FIG. 3, the assistant module 113 determines the most appropriate corrective measures to perform using a neural network implementing a reinforcement learning process A, although it is appreciated that process based on other machine learning techniques are also possible. Reinforcement learning process A is configured to map input 107 to a set of at least one action to apply to input device 105. Preferably, reinforcement learning process A further includes a feedback loop or reward system to learn the effect of previous actions on the input, and improve the mapping between a set of at least one action and features recognized in the input 107. As can be appreciated, reinforcement learning process A can be trained using a static training set. It can further be improved, for example via the feedback loop, to add new records to the training set. That is, the reinforcement process A of the assistant module 113 has an ongoing training process based on input data 107 received by the predictor 111 while the predictor module 111 is in its execution phase.

Figure 4:
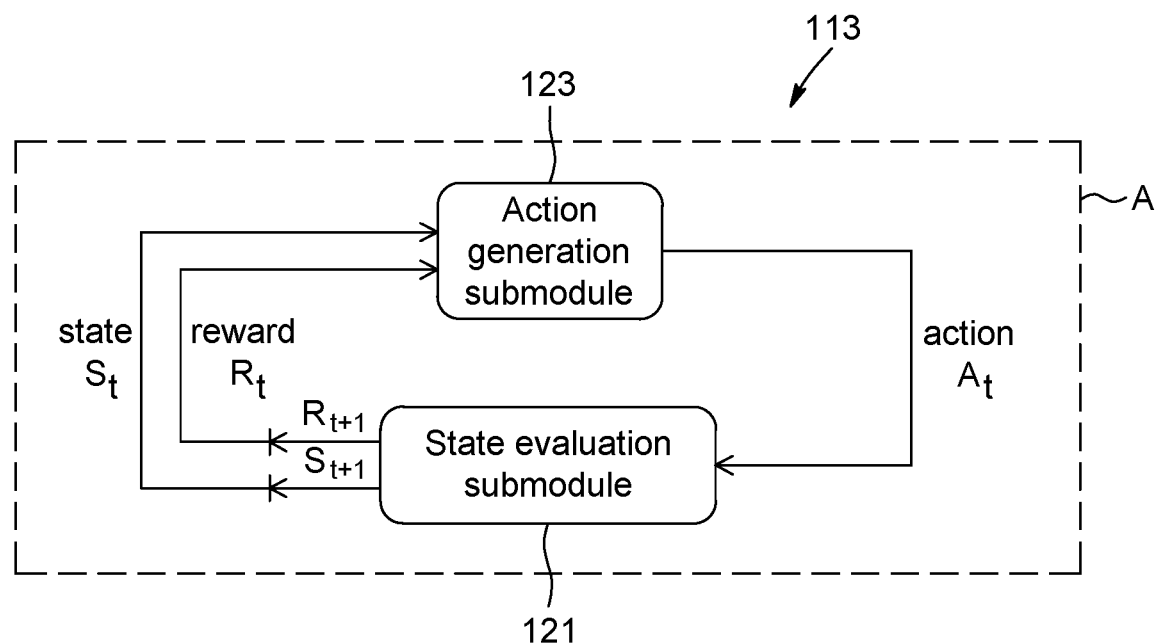
FIG. 4 illustrates a schematic diagram of an exemplary assistant neural network A according to an example embodiment.

With reference to FIG. 4, an exemplary assistant neural network A implemented in assistant module 113 is shown according to an example embodiment. Neural network A includes a state evaluation submodule 121 that is operable to evaluate a current state of the processing by the predictor module 111 of data gathered by the data gathering device 105. In the illustrated example, the state evaluation submodule 121 determines an initial environment state $S_t$, for example corresponding to an input $x_t$ from the input device 105 that makes the predictor module 111 fail in processing the input 107 (ex: the confidence score generated by the predictor module 111 is below the predetermined confidence threshold).

The assistant neural network A of the assistant module 113 further includes an action generation submodule 123 that is operable to generate a set of at least one action to be applied to the input device 105. The action generation submodule 123 maps the current state $S_t$ to a set of at least one action $A_t$ to perform on data gathering device 105. The state evaluation submodule 121 t will subsequently receive a subsequent input 107 and confidence score from the predictor module 111 and further determine an updated environment state $S_{t+1}$, for example corresponding to the new input $x_{t+1}$ gathered by data input device after the set of actions $A_t$ have been performed. A reward $R_t$ is calculated based on the change in the environment states $S_t$ and $S_{t+1}$, for example corresponding to an increase or decrease of confidence in a prediction based thereon. This reward $R_t$ can serve to allow the action generation submodule 123 to measure the effect of a previous action $A_t$ on the environment (ex: the new input $x_{t+1}$ gathered and the increase/decrease of confidence in the prediction), and providing such a measure as a feedback can allow the action generation submodule 123 to learn from previous actions $A_t$. In this configuration, new data to train the assistant module 113 is acquired in a non-selective manner. With additional iterations, the assistant module 113 can learn, over these iterations, how to adjust its generation of the set of at least one action $A_t$ so as to improve gathering of input $x_t$ in a way that leads to better predictions from the predictor module 111. As can be appreciated, using such an process in the context of image processing, assistant module 113 can learn to explore the whole contents of a scene automatically by controlling image capture device 105, and allow more objects to be recognized with higher certainty.

Figure 5:
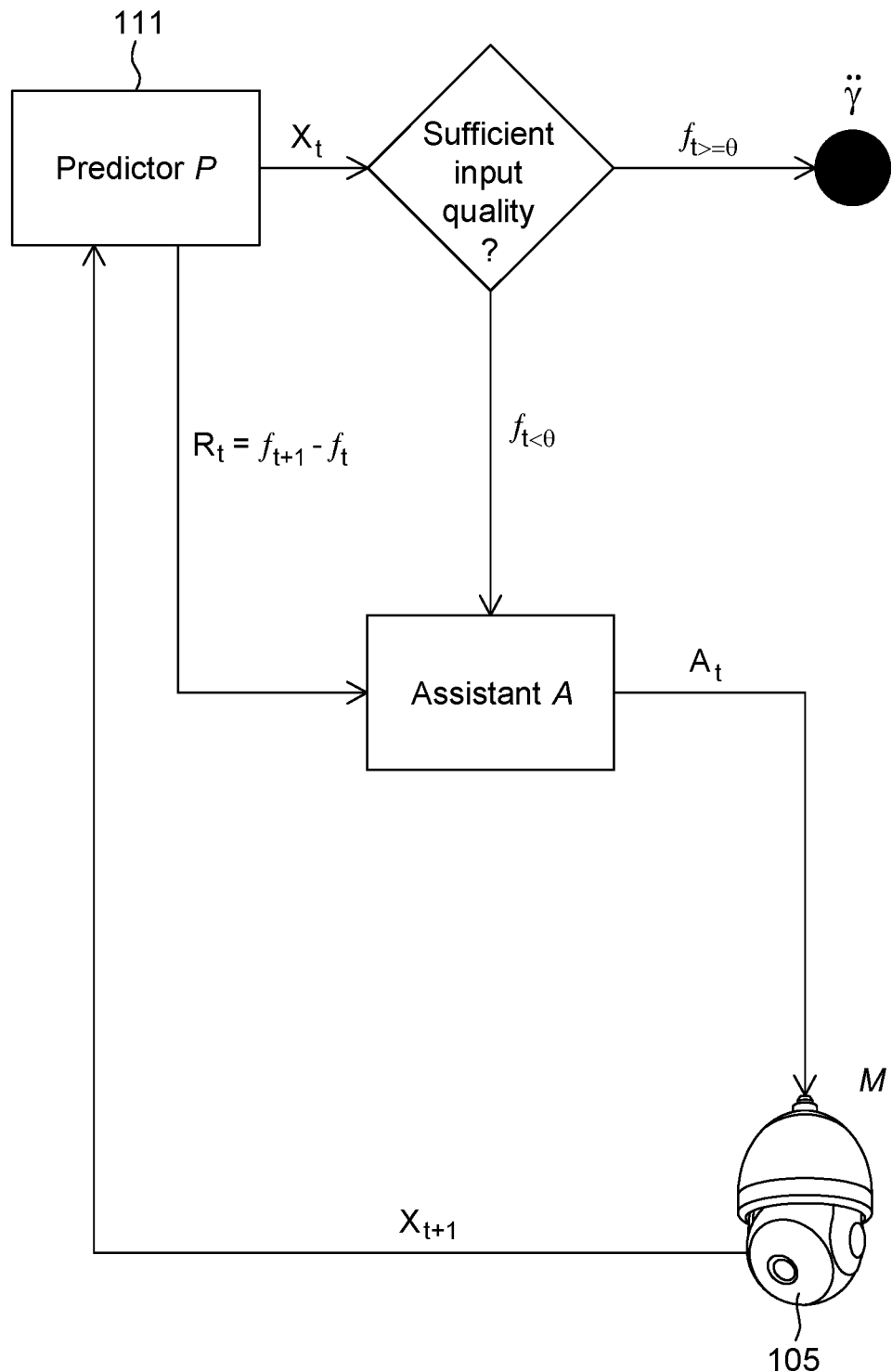
FIG. 5 illustrates a flowchart showing the logical flow of processed data for automatically improving input for machine learning according to an example embodiment.

With reference now to FIG. 5, a flowchart showing the logical flow of processed data for automatically improving input for machine learning is shown in more detail. The automatically improving can have the result of improving the gathering of data by the data gathering device. The logical flow of processed data involves the predictor module 111 and the assistant module 113 (which may be implemented using a processor 101) and a data gathering device 105, as described elsewhere herein. It is appreciated that the logical flow is the result of executing instructions stored on a non-transitory computer readable medium. As part of the logical flow, input device 105 acquires a first input $x_t$ 107 and provides the same to predictor module 111. Upon receiving input $x_t$, predictor module 111 generates a prediction value. Where the prediction carried out includes a classification of the input $x_t$ 107, the predictor module 111 will attempt to map the input $x_t$ to a best corresponding label ÿ (for example recognizing an object in an image by mapping it to a label corresponding to a object class/type). In generating the prediction (ex: mapping the label ÿ), predictor module 111 further calculates a confidence score $f_t$ of the prediction. If the confidence $f_t$ is above a predetermined threshold θ (or alternatively if confidence $f_t$ is within a predetermined range), then the prediction can be considered a success and can be outputted. If the confidence $f_t$ is below the predetermined threshold θ, then assistant module 113 can be operated to tune input device 105. Assistant module 113 will receive input $x_t$ and consider it as a current environment state $S_t$. Assistant module 113 will then generate a set of at least one action $A_t$ and cause it to be applied to the input device 105, for example by sending control signals to operate input device 105. Once the set of at least one action $A_t$ has been applied, input device 105 will acquire a new input $x_{t+1}$ and provide the same to predictor module 111. Upon receiving the new input $x_{t+1}$, predictor module 111 will attempt to map the new input $x_{t+1}$ to a best corresponding label ÿ, while generating a confidence $f_{t+1}$. Assistant module 113 will calculate a reward $R_t$ corresponding to a different between confidence $f_t$ and confidence $f_{t+1}$ (i.e. $R_t=f_{t+1}-f_t$), and the reward $R_t$ is used to adjust a future set of at least one action $A_{t+1}$ to be performed on input device 105. This process can be repeated iteratively for any new input x. As described elsewhere herein, the generation of the prediction (ex: identifying the corresponding label ÿ and confidence score) by the predictor module 111 represents a first machine learning subprocess while the generating of the set of at least one action $A_t$ and the adjusting for subsequent generations of set of at least one action $A_{t+1}$ (ex: via reinforcement learning) represents a second machine learning process.

Figure 6A:
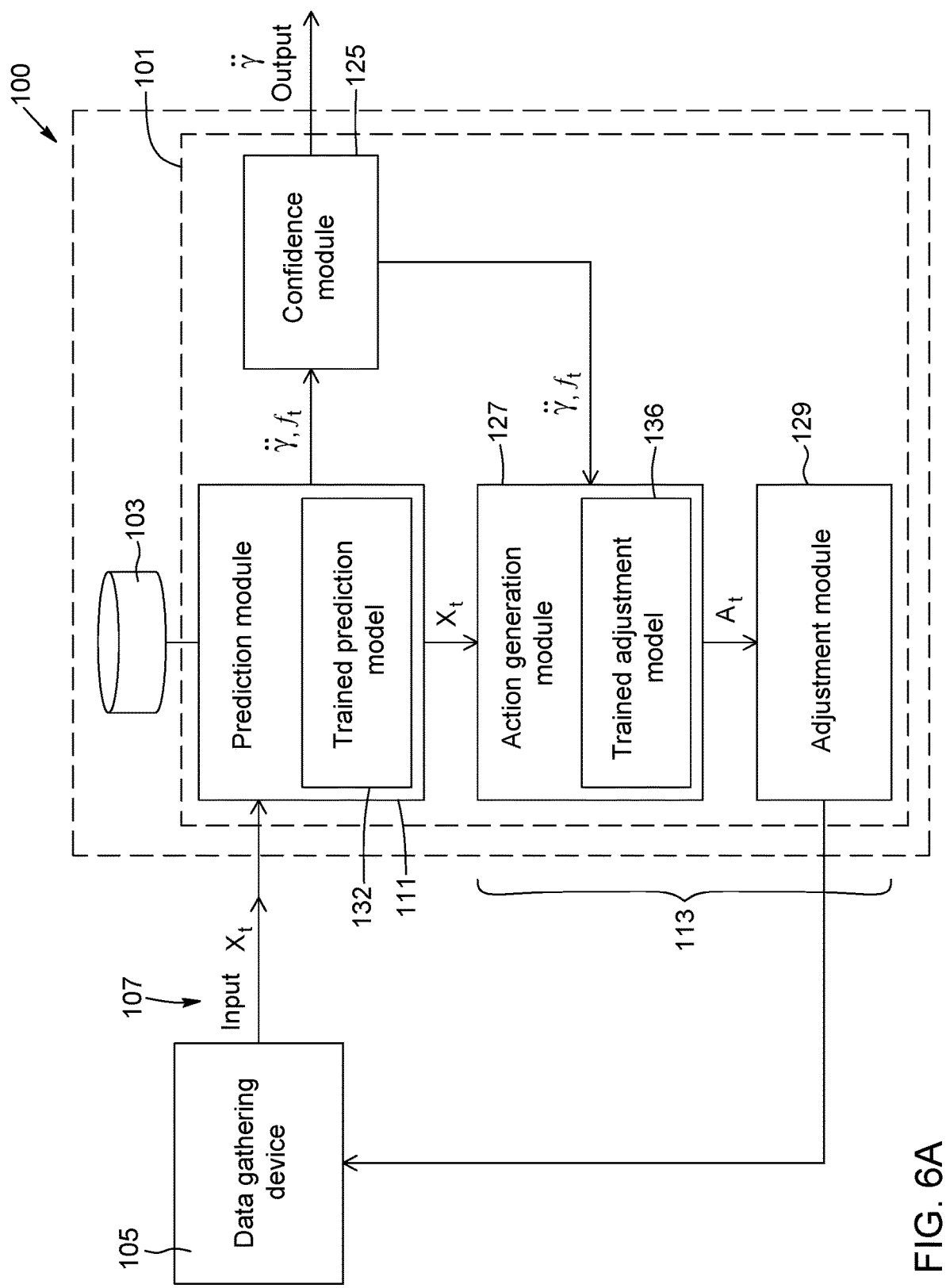
FIG. 6A illustrates a schematic diagram showing the operational model of a general machine learning system having automatic improvement gathering of data according to one example embodiment.

Referring now to FIG. 6A, therein illustrated is a schematic diagram showing the operational model of a general machine learning system 100 having automatic improvement of gathering of data according to one example embodiment. The machine learning system 100 includes the data storage subsystem 103, as described elsewhere herein. The data storage subsystem 103 is in communication with the processor 101 that implements various operational modules. It will be understood that the operational modules provide the functionalities already described herein with reference to the machine learning processes and to FIGS. 2 to 5, but are presented in FIGS. 6A and 6B in accordance to the operational steps that they carry out. More particularly, the generalized machine learning system 100 includes a predictor module 111, a confidence evaluation model 125, an action generation module 127 and an adjustment module 129.

The predictor module 111 provides the same functionality as described elsewhere herein, namely to receive input 107 from the data gathering device 105, and to generate an output 109 that includes a prediction value (ex: label ÿ) with an associated confidence score ($f_t$). That is, the predictor module 111 is configured to receive a first input data that was acquired using the data gathering device 105. The predictor module 111 is further configured to process the first input data to generate a first prediction from the input data and a corresponding confidence score of this first prediction.

The confidence evaluation module 125 is configured to evaluate the prediction made by the predictor module 111. More particularly, the confidence evaluation module 125 is configured to evaluate whether the prediction made by predictor module 111 is successful. For example, and as described elsewhere herein, the confidence evaluation module 125 is configured to determined whether the confidence score for the first prediction generated by the predictor module 111 exceeds a predetermined confidence threshold. Where the first prediction is above the predetermined threshold (ex: the prediction is successful), the first prediction generated by the predictor module 111 is outputted as the processed result of the machine learning system 100. Where the first prediction is below the predetermined threshold (ex: the prediction is not successful), the operation of the assistance module 113 is triggered. For example, and as described elsewhere herein, the confidence score of the first prediction is communicated to the assistance module 113. The input data 107 and/or the predicted label ÿ can also be communicated to the assistance module 113.

The action generation submodule 127 forms part of the assistance module 113 and is operable to generate a set of at least one action to apply to the data gathering device 105. The set of at least one action $A_t$ to be applied can be determined based on the first input data 107. The set of at least one action to be applied can also be based on the confidence score for the first prediction and/or the first prediction (ex: label ÿ) made by the predictor module 111 on the first input data 107.

The set of at least one action $A_t$ to be applied is received at the adjustment module 129. The adjustment module 129 is further operable to generate control signals based on the action $A_t$ to adjust the data gathering device 105 in accordance with the at least one action $A_t$. After applying the at least one action to the data gathering device 105, the data gathering device 105 is operated to acquire a second input data.

The action generation module 127 and the adjustment module 129 combined make up the assistance module (A) 113.

As described elsewhere herein, the data gathering device 105 can be operated at a first set of acquisition settings to the first input data 107 that is representative of a real-world object or condition. The generating of the at least one action $A_t$ includes generating a second set of acquisition settings and the application of this at least one action $A_t$ causes the data gathering device 105 to be configured to the second set of acquisition settings.

The predictor module 111 is further configured to receive the second input data ($x_{t+1}$) that was acquired by the data gathering device 105 after having the set of at least one action $A_t$ applied thereto. The predictor module 111 also processes the second input data to generate a second prediction and a corresponding second confidence score of the second prediction ($f_{t+1}$).

The action generation module 127 is further configured to calculate a difference between the confidence score of the first prediction (ft) and the confidence score of the second prediction (ft+1). It will be appreciated, and as described elsewhere herein, the difference between the confidence scores for the first prediction and the second prediction represent whether applying the set of at least one action $A_t$ to the data gathering device had the effect of differently acquiring input data in a way that improved the prediction made by the predictor module 111.

The action generation module 127 can be further adjusted to modify the set of at least one action to apply to the data gathering device based on the difference between the confidence score for the predictions. For example, modifying the set of at least one action can include generating another set of at least one action ($A_{t+1}$) to be applied. Additionally, or alternatively, the modifying can include adjusting the parameters by which the action generation module 127 generates the set of at least one action ($A_{t+m}$) to be applied for other input data in a later iteration data gathering and prediction.

Continuing with FIG. 6A, according to one example embodiment and as described herein, the operation of the predictor module 111 to generate a prediction based on the input data 107 and to output a corresponding confidence score corresponds to a first machine learning subprocess that is carried out by the machine learning system 100. As illustrated in FIG. 6A, the predictor module 111 includes a prediction model 132. The prediction model 132 is pretrained using a training data set during a training phase. During an execution phase, the prediction module 111 applies the trained prediction model 132 to generate its predictions and the respective confidence scores.

The operation of the action generation module 127 of the assistance module 113 to generate the set of at least one action to apply to the data gathering device 105 corresponds to a second machine learning subprocess that is carried out by the machine learning system 100. As illustrated in FIG. 6A, the predictor module 111 includes an acquisitions settings adjustment model 136 which defines how the set of at least one action is to be generated. The acquisition settings adjustment model 136 can be preconfigured or pretrained. Furthermore, during an execution phase, the adjustment model 136 can be retrained on an ongoing basis based on additionally acquired input data and differences in confidence scores in predictions resulting from sets of adjustment action generated by the action generation module 127. As described elsewhere herein, the action generation module 127 carries out an ongoing reinforcement learning process to update the acquisition settings adjustment model 136. The adjustment can be based on reward $R_t$ (ex: differences between confidence scores and acquired input data in multiple iterations). Accordingly, modifying the set of at least one action to apply to the data gather device can include updating the acquisition settings adjustment model 136 by machine learning, such as reinforcement learning. The updating of the acquisition settings adjustment model can further be based on the first set of acquisition settings and the second set acquisition settings. The updating of the acquisition settings adjustment model can also be based on the first input data and the second input data.

The ongoing and iterative updating of the acquisition settings adjustment model 136 of the action generation module 127 based on iterations of acquisition of data and the adjustment of the data gathering device to acquire further data has the aim of improving the efficacy of the manner in which the data gathering device is configured and/or adjusted to improve input quality. As described elsewhere, the efficacy of the machine learning process is heavily dependent on input quality of the input data. The updating of the acquisition settings adjustment model, such as through reinforcement learning, can lead to the data gathering device 105 being appropriately reconfigured/adjusted so that a successful prediction (ex: confidence score exceeding the predetermined confidence) occurs with greater frequency.

The reconfiguration/adjustment based on the acquisition settings adjustment model can occur prior to an initial gathering data representative of a given real-world object or recondition. Additionally, or alternatively, the acquisition settings adjustment model can occur after initially gathering input data is of insufficient quality and a set of at least one action A is generated and applied to the data gathering device.

Continuing from above, after first input data ($x_t$) and second input data ($x_{t+1}$) has been acquired by data gathering device 105, a third input data ($x_{t+m}$) acquired by the data gathering device 105 can be received by the predictor module 111. The third input data ($x_{t+m}$) is processed by the predictor module 111 to generate a third prediction and a corresponding confidence score ($f_{t+m}$). It will be appreciated that the acquisition settings of the data gathering device are adjusted between the acquiring of the first input data and the acquiring of the second input data. It will be further appreciated that acquisitions settings adjustment model 136 can be updated based on the difference between the first prediction applied to the first input data and the second prediction applied to the second input data.

If it is determined that the third prediction is of insufficient quality (ex: confidence score of the third prediction is below the predetermined threshold), the action generation module 127 is configured to generate an additional set of at least one action apply to the data gathering device. This generation of additional set of at least one action is based on the acquisition settings adjustment model 136 as previously updated. In most cases, the efficacy of the updated acquisitions settings model 136 will have been improved. The generation of the additional set of at least one action can further be based on the third input data. The adjustment module 129 is further configured to apply the additional set of at least one action to the data gathering device 105. The data gathering device 105 is then operated to acquire a fourth input data. This fourth input data is received at the predictor module 111. It will be understood that the efficacy of the predictor module 111 should be improved because the adjustment to the data gathering device 105 after acquiring the third input data and prior to acquiring the fourth input data is made based on the updated acquisition settings adjustment model 136.

Figure 6B:
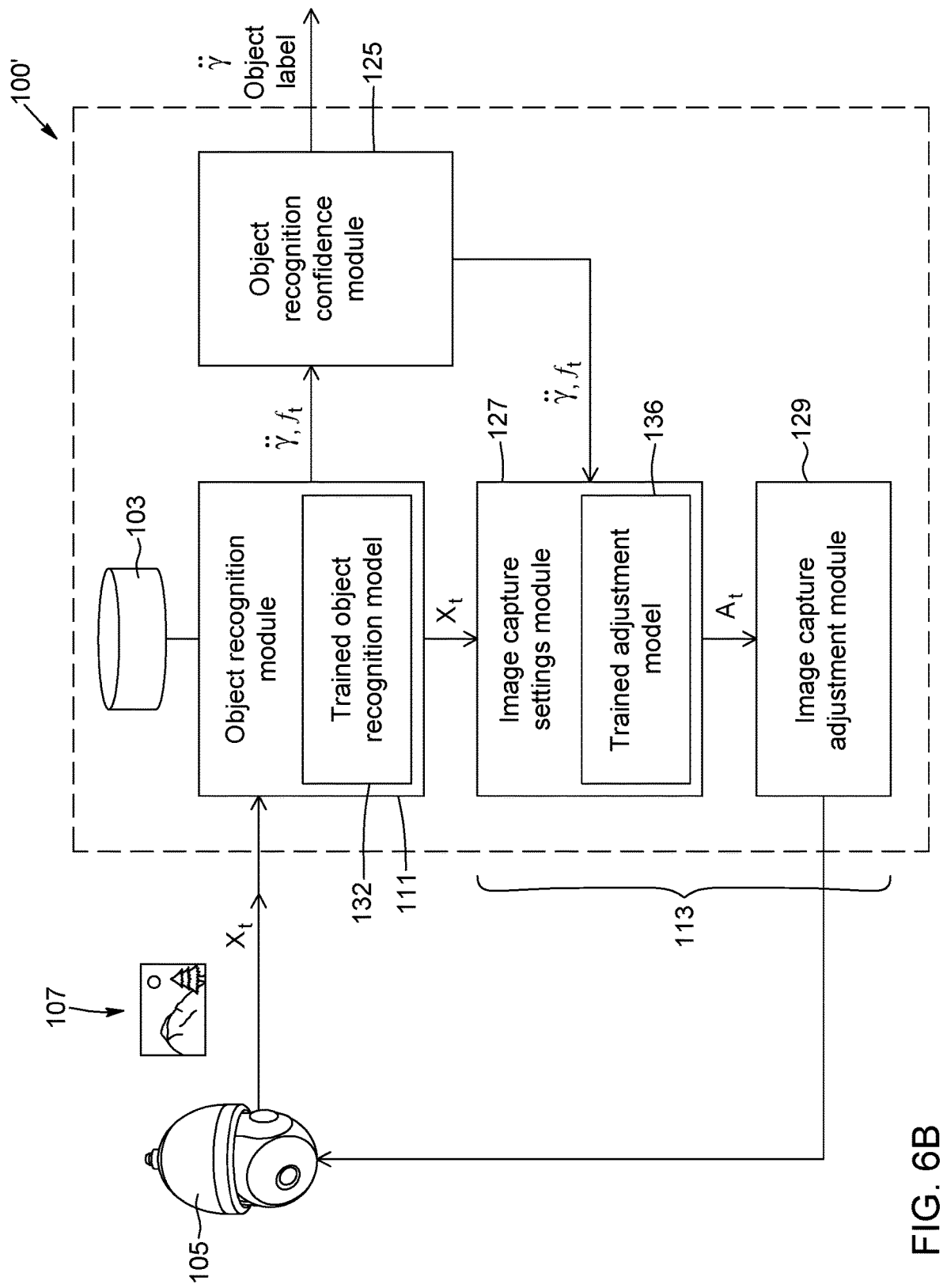
FIG. 6B illustrates a schematic diagram showing the operational model of a machine learning system having automatic improvement of gathering of data as applied to image recognition according to one example embodiment.

Referring now to FIG. 6B, therein illustrated is a schematic diagram showing the operational model of a machine learning system 100' having automatic improvement of gathering of data as applied to image recognition according to one example embodiment. The image recognition-enabled machine learning system 100' has the same operational modules of machine learning system as described with reference to FIG. 6A, but is applied specifically to the context of image recognition.

Accordingly, the image recognition-enabled machine learning system 100' is in communication with a data gathering device 105 in the form of an image acquisition device 105 that acquires input data 107 in the form of digital images. The image acquisition device 105 can be a camera that captures digital images that is representative of graphical information in the human-visible frequency range. Alternatively, the image acquisition device 105 can be another type of camera that captures digital images that is representative of graphical information outside of the human-visible frequency range, such as infra-red camera, radar or LIDAR. Accordingly, the first input data can be a first captured image that is captured with the image capture device 105 set at a first set of image acquisition settings.

The predictor module 111 of the image recognition-enabled machine learning system 100' is an object recognition module that is operable to generate a prediction in the form of a recognition of an object located within the scene of the captured digital image and a confidence score indicating the confidence of the recognition of that object. Where the object recognition includes object classification, the prediction can be a classification of the object by type/class and the confidence score that the object is of that type/class. Accordingly, the trained prediction model 132 can be a trained object recognition model (ex: object classification model). The trained object recognition model can be pre-trained using a training image set.

The confidence evaluation module 125 is an object recognition confidence module and operates in the same manner to evaluate whether an object recognition (ex: object classification) performed by the object recognition module 111 was successful, such as by determining whether the confidence score exceeds the predetermined confidence threshold.

The action generation module 127 of the image recognition-enabled machine learning system 100' is an image capture settings adjustment module. The set of at least one action to apply to the data gathering device 105 that is generated by the image capture settings adjustment module 127 includes a set of adjusted image capture settings. The image capture settings adjustment module 127 further includes an acquisition settings adjustment model 136 in the form of an image capture settings adjustment model 136 that defines parameters for generating the set of adjusted image capture settings. The image capture settings adjustment model 136 can be updated on an ongoing basis, such as by reinforcement learning.

The adjustment module of the image recognition-enabled machine learning system 100' is an image capture adjustment module and is operable to output control signals for configuring the image capture device 105 to the set of image capture settings generated by the image capture settings adjustment module 127.

The image capture device, being configured to the adjusted first set of image capture settings, is operated to capture the second input data in the form of a second digital image. The second prediction is generated by the object recognition module 111 applied to the second digital image. This can be a classification of one or more objects found in the scene captured in the second digital image and the confidence score of the second prediction is a classification of the object of the second digital image.

The image capture settings adjustment module 127 is further configured to update the image capture settings adjustment model 136 based on the difference between the classification score for the first captured digital image and the classification score for the second captured digital image. This updating can also be based on other parameters, such as the first set of image capture settings used for capturing the first digital image and the second set of image capture settings used for capturing the second digital image. It will be understood that the image capture settings adjustment model 136 as updated is used for adjusting the image capture device 105 in subsequent iterations of image capture and object recognition for subsequent digital images.

In the context of gathering image data using an image capture device and applying object recognition to the captured digital images, the sets of image capture settings define the adjustments to image capture settings made to the image capture device when capturing the same real-world object or scene so that images captured after the adjustments have greater efficacy when applying object recognition. Such adjustments include one or more of the following of the image capture device:

Zoom;
Pan;
Tilt;
White balance;
Exposure;
ISO settings;
Aperture;
Shutter speed;
Depth sensor;
Frame rate.

The adjustments can also include one or more of the following of a device associated to the image capture device;

Positioning (ex: geographical location, height, orientation) of an autonomous vehicle on which the image capture device is mounted, such as a drone having a camera mounted thereto;
Adjustment to lighting systems illuminating a scene being captured.

As described elsewhere herein, the updating of the image capture settings adjustment model has the goal of improving the efficacy of adjusting the image capture device in subsequent iterations to improve the frequency that the image recognition module will successfully predict an object within a captured digital image. Accordingly, after updating the adjustment model 136 based on the differences between the first captured digital and the second captured digital image, a third digital image of another object or scene is captured using the image capture device 105 and is received by the object recognition module 111. This third digital image is processed to apply object recognition (ex: object classification) and a confidence score (ex: classification score) for the object of the third captured digital image is generated. If the confidence score (ex: classification score) for the object of the third captured digital is below the predetermined threshold, then the image capture settings of the image capture device is further adjusted. In this case, an additional set of image capture settings to be applied to the image capture device 105 is generated based on the third digital image and the image capture settings adjustment model as updated. Since the image capture settings adjustment model is updated, such as by reinforcement learning, to take into account the result of an earlier adjustment that was carried out, there is an improvement in the efficacy in adjusting the image capture settings to capture fourth digital image that will have a higher likelihood of having successful object recognition (ex: object classification). Accordingly, the image capture device 105 is operated to acquire a fourth digital image while being configured to the additional set of image capture settings. The fourth digital image is received at the object recognition module 111 for further processing.

Figure 7A:
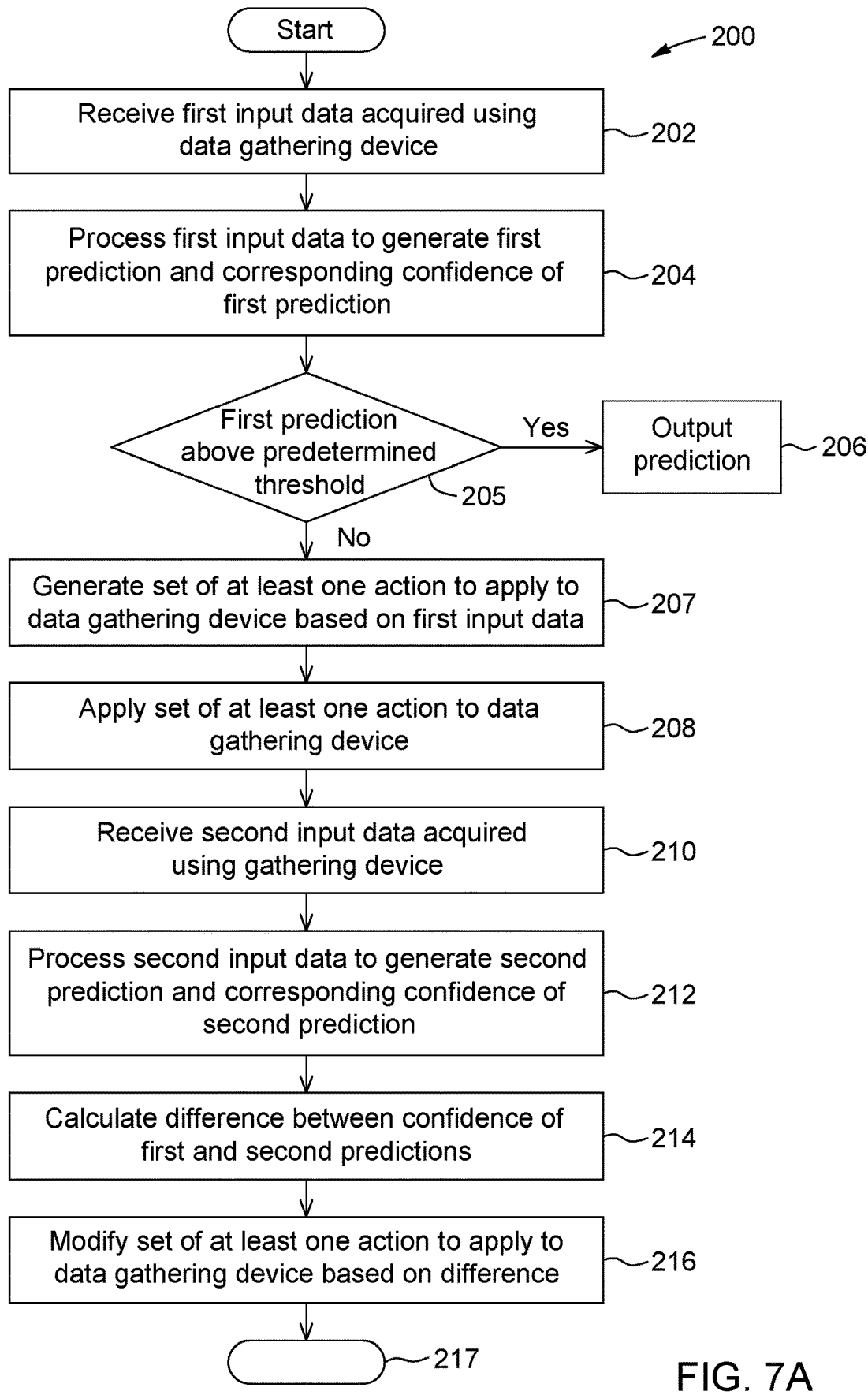
FIG. 7A illustrates a flowchart showing the operational steps of a method for automatically improving gathering of data according to one example embodiment.

Referring now to FIG. 7A, therein illustrated is a flowchart showing the operational steps of a method 200 for automatically improving gathering of data according to one example embodiment. As described elsewhere herein, the method can be carried out at the machine learning system 100 described herein according to various example embodiments.

At step 202, first input data 107 acquired using the data gathering device 202 is received. This first input data is received by the predictor module 111 after the data gathering device 202 had previously been operated to acquire the first input data while being configured to a first set of acquisition settings. In the context of image recognition, the first input data 107 is a digital image acquired using an image capture device 105.

At step 204, the first input data is processed to generate a first prediction and corresponding confidence score of the first prediction. The processing of the first input data is carried out at the predictor module 111. In the context of image recognition, the first prediction can be a recognition of an object within the scene and/or a classification of that object by type of class.

At step 205, it is determined whether the first prediction is successful. As described elsewhere herein, this can be carried out by determining whether the confidence score for the first prediction is below or above a predetermined confidence threshold. If the first prediction is successful (ex: confidence score exceeds predetermined confidence score), the method 200 moves to step 206 to output the prediction that is generated. If the first prediction is not successful (ex: confidence score is below the predetermined confidence score), the method moves step 207. The determination of whether first prediction is carried at the confidence evaluation module 125.

At step 207, a set of at least one action to apply to the data gathering device is generated based on the first input data. As described elsewhere, the set of at least one action can be a set of acquisition settings of data gathering device. The set of at least one action to be applied is generated at the action generation module 127. As described elsewhere herein, the set of at least one to-be-applied action can be generated based on an adjustment model. In the context of image recognition, the at least one action can be a set of image capture settings to be applied to the image capture device. This set of image capture settings can be generated based on an image capture settings adjustment model.

At step 208, the set of at least one action is applied to the data gathering device. This step can be carried out by the adjustment module 129 that generates control signals and transmits them to the data gathering device as a feedback signal. In the context of image recognition, step 208 can include configuring the image capture device to the set of image capture settings generated at step 207.

At step 210, second input data acquired by the data gathering device is received. The second input data is acquired after the at least one action has been applied to the data gathering device. For example, where the set of at least one action defines a set of acquisition settings, the data gathering device is configured to the set of settings and the second input data is then acquired. The second input data is received by the predictor module 111. In the context image recognition, a second digital image acquired with the image capture device configured to the set of image capture settings of step 208 is received.

At step 212, a second prediction is generated based on the second input data and a second confidence score for the second prediction is generated. The second prediction can be generated by the predictor module 111. In the context of image recognition, the second prediction is an image recognition and/or classification of an object of the scene captured in the second image. The captured real-world object is the same object captured in the first captured image received at step 202, but the image parameters will differ due to the application of the adjusted set of image capture settings. The different image parameters should improve likelihood of the successfully recognizing/classifying the object.

At step 214 the difference between the confidence score of the first prediction and the confidence score of the second prediction is calculated. This difference can be calculated at the action generation module 127.

At step 216, the set of at least one action to apply to the data gathering device is modified. This step can include updating the acquisition settings adjustment model 136 so as to improve the model 136 for adjustments to be made in subsequent iterations. The updating can also be based on the first input data, the second input data, the first set of acquisition settings and/or the second set of acquisition settings. In the context of image recognition, this step includes updating the image capture settings adjustment model 136. The updated image capture settings adjustment model 136 can be applied to subsequent iterations of image recognition of other objects in other digital images.

Figure 7B:
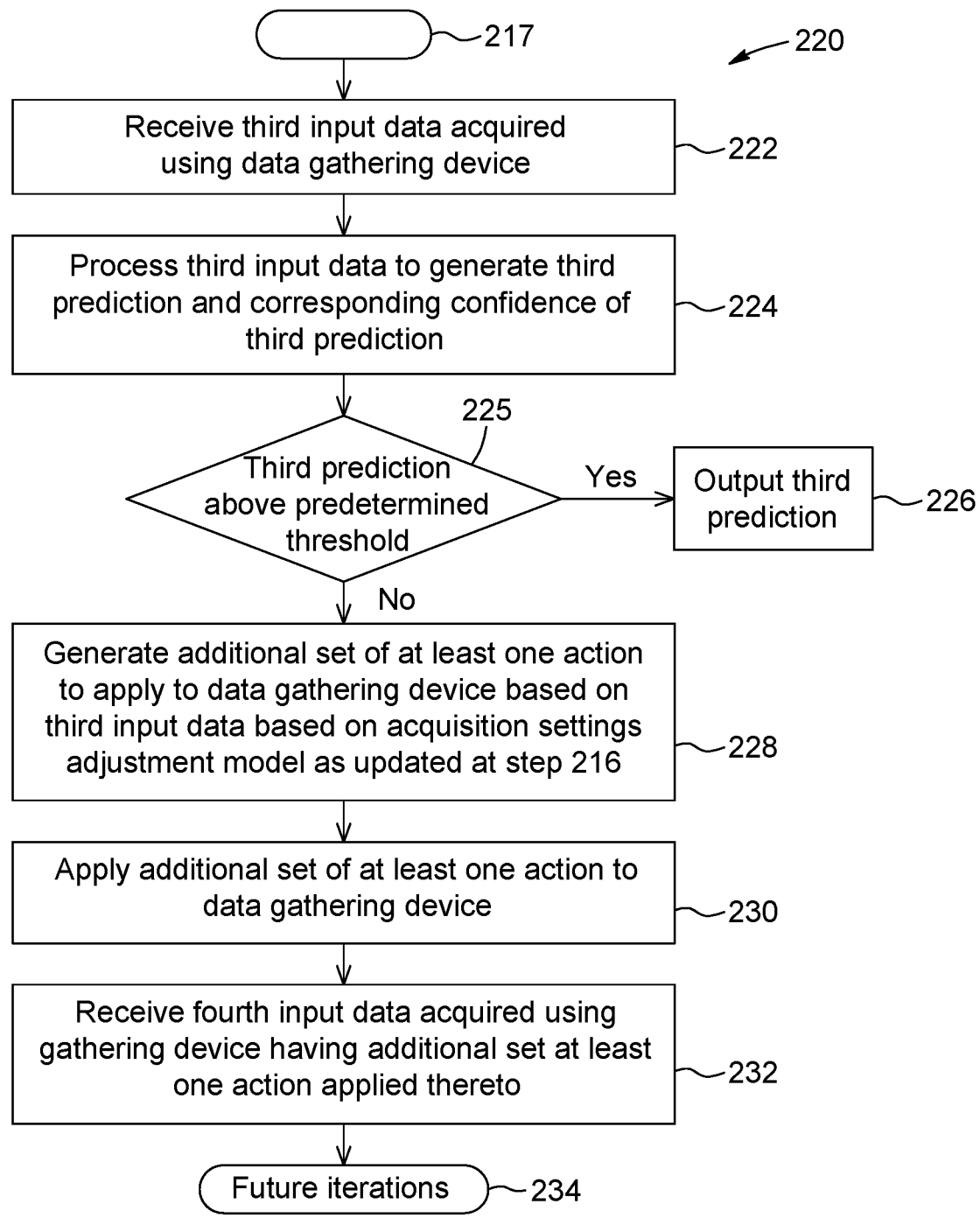
FIG. 7B illustrates a flowchart showing the operational steps of a method for carrying out processing of input data for another iteration subsequent to the carrying out of the method of FIG. 7A.

Referring now to FIG. 7B, therein illustrated is flowchart showing the operational steps of a method 220 for carrying out processing of input data for a subsequent iteration. It will be understood that method 220 is carried out after step 216 has been carried out in which the acquisition settings adjustment model 136 has been updated.

At step 222, third input data acquired using the data gathering device is received. The third input data can be received at the predictor module 111. In the context image recognition, a third digital image that is captured using the image capture device is received.

At step 224, the third input data is processed to generate a third prediction and a corresponding confidence score of the third prediction. This can be generated at the predictor module 111. In the context of image recognition, a prediction of the object found in the third digital image is generated.

At step 225, it is determined whether the third prediction is successful. As described elsewhere herein, this can be carried out by determining whether the confidence score for the third prediction is below or above a predetermined confidence threshold. If the third prediction is successful (ex: confidence score exceeds predetermined confidence score), the method 220 moves to step 226 to output the prediction that is generated. If the third prediction is not successful (ex: confidence score is below the predetermined confidence score), the method moves to step 228.

At step 228, an additional set of at least one action to be applied to the data gathering device is generated. This additional set is generated according to the acquisition settings model 136 having already been updated at step 216. This step can include generating an additional set of acquisition settings to be applied to the gathering device. This step can be carried out at the action generation module 127. In the context of image recognition, this step includes generating another set of image capture settings based on the image capture settings adjustment model updated at step 216.

At step 230, the additional set of at least one action is applied to the data gathering device. This can include generating control signals that are then transmitted to the data gathering device. This step can be carried out at the adjustment module 129.

At step 232, fourth input data that is acquired by the data gathering device having the additional set of at least one action applied thereto is received. This step can be carried out at the predictor module 111. In the context of image recognition, this step includes receiving a fourth digital image captured using the image capture device configured to the set of image capture settings generated at step 228.

It will be appreciated that the prediction on the fourth digital image has a higher likelihood of success because it was captured after that image capture device was adjusted based on the updated image capture settings adjustment model. This model should more accurately determine how to adjust an image capture device in the case of a failure in image recognition of a given object of a scene (ex: in the third image) so that a subsequently captured image (ex: in the fourth image) of the same object has a higher likelihood of successful prediction.

At step 234, the method can be continued to update the adjustment model 136 on an ongoing basis for further iterations. For example, the model 136 can be updated again based on the difference between the third input data received at step 222 and the fourth input data received at 232, and furthermore on a continuous basis for subsequent iterations.

In one exemplary implementation, the machine learning system and method with automatic data gathering improvement described herein can be applied in the affirmative vision field. The affirmative vision field herein refers to the process of finding and affirming the vision of an object or a feature recognized in the scene captured in a digital image or images. In a first sub-class of the affirmative vision field, namely the security & surveillance subfield, systems and methods described herein can be used in security application for monitoring accurately who/what is on-site. For example, the capture of security and surveillance footage using a security camera can be improved by automatically improving the tuning of the camera to further increase object recognition/classification. The advantage is that it reduces the false threat detection. It also has an inherent sense of redundancy, given the nature of the adaptivity within the system.

In a second sub-class of the affirmative vision field, namely robotics & automation, systems and methods described herein can be used to address the proliferation of robotic applications. By properly locating objects and affirming that it is the object or the feature of interest, robotics system can perform reliable and efficient articulation maneuvers.

In a third sub-class of the affirmative vision field, namely autonomous systems (ex: autonomous vehicles), systems and methods described herein aid autonomous systems to continuously interact with their surrounding, and therefore, maintain a high level of confidence of vision that is vital for safe and robust operation.

In a fourth sub-class of the affirmative vision field, namely UAV (unmanned aerial vehicle) counting systems, systems and methods described herein can assist with finding and recognizing an object of particular interest on the ground level, and assist in counting, classifying, detection and tracking. It will be appreciated that aerial imaging requires scanning through large areas from a far distance.

In another exemplary implementation, the machine learning system and method with automatic data gathering improvement described herein can be applied for subclassification applications.

In a first subclassification application, namely space application or terrain soil classification, systems and methods described herein can be used for a robust solution of terrain recognition and soil type classification to assist in visual navigation systems deployed on space exploration rovers as well as terrestrial rover navigation.

In a second subclassification application, namely multi-label classification (i.e. classifying multiple objects within a same scene), systems and methods described herein can provide improvements through prompting the reinforcement learning vision system to continuously look for all the objects found within a scene (i.e. appropriately labelling all of the objects), and only stop when each object has been recognized/classified with the required accuracy.

In a third subclassification application, namely contextual and reasoning systems, proper multi-label classification can further improve contextual and reasoning systems that rely on accurate metadata about objects and environment in order to deduce concepts, actions and patterns.

In a fourth subclassification application, namely next generation in-store analytics (ex: brick and mortar stores), systems and methods described herein can be used to enrich objects classified as part of the analytics. For example, a simple metadata for a jacket could be just [Jacket]. Improved classification from improved image capture can allow for more detail, such as [Jacket, Red], or even more granularity and refinement, such as [Jacket, Red, Wool Texture, etc].

In a fifth subclassification application, namely advanced UAV Vision, systems and methods described herein can be used long with UAV systems to rapidly structure an area of land, and classify the vegetation, housing, roads, etc. The following are examples of the level of detail that can be achieved:

[Green canopy, alfa-alfa, long]
[terrain, road, asphalt]
[building, family house, single home house]

In yet another exemplary implementation, the machine learning system and method with automatic data gathering improvement described herein can be applied for situational awareness applications. Systems and methods described herein can be coupled with an initial computer vision algorithm to evaluate areas of interest in a large area, providing a starting point for areas of interest, where an anomaly or a threat was detected. This initial refinement could lead to detecting objects that initially, could not be detected by typical computer vision solutions. The process of requesting more information about the unknown detected anomalies will activate systems and methods described herein to investigate and classify the threat further. This technique can be further applied to security, high fidelity surveillance and Large area monitoring fields. For example, systems and methods can be applied within an image recognition solution to operate autonomously to detect objects that were not once detected and to verify their nature (particularly effective for security domain for high sensitivity locations). Utilization of this methodology will also lead to replacing extensive sensor deployment in high fidelity monitoring locations. Additionally, there is a continuous need to survey vast areas such as maritime, on sea and on-shore as well as Arctic regions.

The systems and methods described above provide a proactive learning approach to neural networks, specifically to control a data gathering device in order to provide a predictor neural network an input that is more likely to result in improved prediction accuracy, and/or in order to allow more data to be collected for a deeper analysis. Although particular examples were given in the context of machine vision and object recognition, it is appreciated that the subject-matter described herein is also applicable to other machine learning tasks. Moreover, although data gathering device was exemplified herein as a camera, it is appreciated that other data gathering devices or modules are also possible, such as various different types of electronic sensors and/or combination of several sensors, for example including LIDAR and Radar. It is further appreciated that although assistant A is depicted herein as a proactive neural network, it is appreciated that other learning algorithms are also possible.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention.

The invention claimed is:

1. A computer-implemented method for automatically improving gathering of data, the method comprising:
    receiving first input data acquired using a data gathering device;
    processing the first input data to generate a first prediction and a first confidence score corresponding to the first prediction, wherein the first input data is processed using a predictor module that is pre-trained using machine learning to generate predictions and corresponding confidence scores of said predictions based on parameters learned from a training dataset; and
    if the first confidence score is below a predetermined threshold:
        processing at least the first input data and the first confidence score to generate a first set of at least one action to apply to the data gathering device, wherein the first confidence score and the first input data are processed using an assistant module that is pre-trained using machine learning to generate actions to apply to the data gathering device that improve a quality of input data to allow predictions with higher confidence scores;
        applying the first set of at least one action to the data gathering device;
        receiving second input data acquired using the data gathering device;
        processing the second input data using the predictor module to generate a second prediction and a second confidence score corresponding to the second prediction; and
        if the second confidence score is below the predetermined threshold:
            calculating a difference between the first confidence score and the second confidence score;
            processing at least the second input data and the difference between the first confidence score and the second confidence score using the assistant module to generate a second set of at least one action to apply to the data gathering device; and
            applying the second set of at least one action to the data gathering device.

2. The method of claim 1, wherein the first input data is acquired in accordance with a first set of acquisition settings of the data gathering device;
    wherein the assistant module is configured to generate a second set of acquisition settings of the data gathering device based on a computer-implemented acquisition settings adjustment model;
    wherein applying the first set of at least one action to the data gathering device comprises configuring the data gathering device in accordance with the second set of acquisition settings;
    wherein acquiring the second input data using the data gathering device comprises acquiring the second input data while the data gathering device is configured to the second set of acquisition settings; and
    wherein applying the second sets of at least one action to the data gathering device comprises updating the acquisition settings adjustment model based on the difference between the first confidence score and the second confidence score.

3. The method of claim 2, wherein the acquisition settings adjustment model is further updated based on the first set of acquisition settings and the second set of acquisition settings.

4. The method of claim 2, wherein the computer-implemented acquisition settings adjustment model is pre-trained using machine learning; and
    wherein updating the acquisition settings adjustment model based on the difference is carried out using reinforcement learning.

5. The method of claim 2, further comprising:
    acquiring a third input data using the data gathering device;
    processing the third input data using the predictor module to generate a third prediction and a third confidence corresponding to the third prediction; and
    if the third prediction is below the predetermined threshold:
        processing at least the third input data and the third confidence score to generate a third set of at least one action to apply to the data gathering device by generating a third set of acquisition settings of the data gathering device based on the acquisition settings adjustment model as updated;
        applying the third set of at least one action to the data gathering device; and
        acquiring fourth input data using the gathering device having the third set at least one action applied thereto.

6. The method of claim 1, wherein the data gathering device is an image capture device;
    wherein the first input data is a first digital image captured by the image capture device.

7. The method of claim 6, wherein processing the first input data to generate a first prediction comprises applying object classification on the captured digital image;
    wherein the first prediction is a classification of an object within a scene of the first captured digital image;
    wherein the first confidence score is a classification score for the classified object of the first captured digital image;
    wherein the second input data is a second digital image captured by the image capture device;
    wherein the second prediction is a classification of the object within the scene of the second captured digital image; and
    wherein the second confidence score is a classification score for the classified object of the second captured digital image.

8. The method of claim 7, wherein the first set of acquisition settings of the data gathering device is a first set of image capture settings of the image capture device;
    wherein the assistant module is configured to generate a second set of image capture settings of the image capture device based on an image capture settings adjustment model;

wherein applying the first set of actions to the data gathering device comprises configuring the image capture device in accordance with the second set of image capture settings;

wherein acquiring second input data using the data gathering device comprises acquiring the second digital image while the image capture device is configured to the second set of image capture settings; and wherein applying the second set of at least one action to the data gathering device comprises updating the image capture settings adjustment model based on the difference between the classification score for the first captured digital image and the classification score for the second captured digital image.

9. The method of claim 8, wherein the image capture settings adjustment model is further updated based on the first set of image capture settings and the second set of image capture settings.

10. The method of claim 8, wherein the first or second image capture settings comprises one or more of zoom, pan, tilt, white balance, exposure, ISO settings, aperture, shutter speed, depth sensor, frame rate, position of a vehicle having the image capture device mounted thereto and lighting subsystem.

11. The method of claim 8, wherein the image capture settings adjustment model is pre-trained using machine learning; and
wherein updating the image capture settings adjustment model based on the difference is carried out using reinforcement learning.

12. The method of claim 8, further comprising:
receiving a third digital image acquired using the image capture device;
processing the third digital image to apply a classification of an object within the scene of the third digital image and to generate a classification score for the classified object of the third captured digital image;
if the classification score for the classified object of the third captured digital image is below the predetermined threshold:
processing at lease the third digital image and the classification score for the classified object of the third captured digital image to generate a third set of image capture settings to apply to the image capture device based on the image capture settings adjustment model as updated;
applying the third set of image capture settings to the image capture device; and
receiving a fourth digital image acquired using the image capture device having the third set of image capture settings applied thereto.

13. A computer-implemented system for automatically improving gathering of data, the system comprising:
at least one data storage device; and
at least one processor operably coupled to the at least one storage device, the at least one processor being configured for:
receiving first input data acquired using a data gathering device;
processing the first input data to generate a first prediction and a first confidence score corresponding to the first prediction, wherein the first input data is processed using a predictor module that is pre-trained using machine learning to generate predictions and corresponding confidence scores of said predictions based on parameters learned from a training dataset; and
if the first confidence score is below a predetermined threshold:
processing at least the first input data and the first confidence score to generate a first set of at least one action to apply to the data gathering device, wherein the first confidence score and the first input data are processed using an assistant module that is pre-trained using machine learning to generate actions to apply to the data gathering device that improve a quality of input data to allow predictions with higher confidence scores;
applying the first set of at least one action to the data gathering device;
receiving second input data acquired using the data gathering device;
processing the second input data using the predictor module to generate a second prediction and a second confidence score corresponding to the second prediction; and
if the second confidence score is below the predetermined threshold:
calculating a difference between the first confidence score and the second confidence score;
processing at least the second input data and the difference between the first confidence score and the second confidence score using the assistant module to generate a second set of at least one action to apply to the data gathering device; and
applying the second set of at least one action to the data gathering device.

14. The system of claim 13, wherein the first input data is acquired in accordance with a first set of acquisition settings of the data gathering device;
wherein the assistant module is configured to generate a second set of acquisition settings of the data gathering device based on a computer-implemented acquisition settings adjustment model;
wherein applying the first set of at least one action to the data gathering device comprises configuring the data gathering device in accordance with the second set of acquisition settings;
wherein acquiring the second input data using the data gathering device comprises acquiring the second input data while the data gathering device is configured to the second set of acquisition settings; and
wherein applying the second sets of at least one action to the data gathering device comprises updating the acquisition settings adjustment model based on the difference between the first confidence score and the second confidence score.

15. The system of claim 14, wherein the acquisition settings adjustment model is further updated based on the first set of acquisition settings and the second set of acquisition settings.

16. The system of claim 14, wherein the computer-implemented acquisition settings adjustment model is pre-trained using machine learning; and
wherein updating the acquisition settings adjustment model based on the difference is carried out using reinforcement learning.

17. The system of claim 14, wherein the processor is further configured for:
acquiring a third input data using the data gathering device;

processing the third input data using the predictor module to generate a third prediction and a third confidence corresponding to the third prediction; and if the third prediction is below the predetermined threshold:
  processing at least the third input data and the third confidence score to generate a third set of at least one action to apply to the data gathering device by generating a third set of acquisition settings of the data gathering device based on the acquisition settings adjustment model as updated;
  applying the third set of at least one action to the data gathering device; and
  acquiring fourth input data using the gathering device having the third set at least one action applied thereto.

18. The system of claim 13, wherein the data gathering device is an image capture device;
  wherein the first input data is a first digital image captured by the image capture device.

19. The system of claim 18, wherein processing the first input data to generate a first prediction comprises applying object classification on the captured digital image;
  wherein the first prediction is a classification of an object within a scene of the first captured digital image;
  wherein the first confidence score is a classification score for the classified object of the first captured digital image;
  wherein the second input data is a second digital image captured by the image capture device;
  wherein the second prediction is a classification of the object within the scene of the second captured digital image; and
  wherein the second confidence score is a classification score for the classified object of the second captured digital image.

20. The system of claim 19, wherein the first set of acquisition settings of the data gathering device is a first set of image capture settings of the image capture device;
  wherein the assistant module is configured to generate a second set of image capture settings of the image capture device based on an image capture settings adjustment model;
  wherein applying the first set of actions to the data gathering device comprises configuring the image capture device in accordance with the second set of image capture settings;
  wherein acquiring second input data using the data gathering device comprises acquiring the second digital image while the image capture device is configured to the second set of image capture settings; and
  wherein applying the second set of at least one action to the data gathering device comprises updating the image capture settings adjustment model based on the difference between the classification score for the first captured digital image and the classification score for the second captured digital image.

21. The system of claim 20, wherein the image capture settings adjustment model is further updated based on the first set of image capture settings and the second set of image capture settings.

22. The system of claim 20, wherein the first or second image capture settings comprises one or more of zoom, pan, tilt, white balance, exposure, ISO settings, aperture, shutter speed, depth sensor, frame rate, position of a vehicle having the image capture device mounted thereto and lighting subsystem.

23. The system of claim 20, wherein the image capture settings adjustment model is pre-trained using machine learning; and
  wherein updating the image capture settings adjustment model based on the difference is carried out using reinforcement learning.

24. The system of claim 20, wherein the processor is further configured for:
  receiving a third digital image acquired using the image capture device;
  processing the third digital image to apply a classification of an object within the scene of the third digital image and to generate a classification score for the classified object of the third captured digital image;
  if the classification score for the classified object of the third captured digital image is below the predetermined threshold:
    processing at least the third digital image and the classification score for the classified object of the third captured digital image to generate a third set of image capture settings to apply to the image capture device based on the image capture settings adjustment model as updated;
    applying the third set of image capture settings to the image capture device; and
    receiving a fourth digital image acquired using the image capture device having the third set of image capture settings applied thereto.

25. A non-transitory computer-readable medium having instructions stored thereon for execution by a processor, the instructions when executed by the processor performing the method of claim 1.

* * * * *